United States Patent
Nakamura

(10) Patent No.: US 7,182,707 B2
(45) Date of Patent: **\*Feb. 27, 2007**

(54) BELT-DRIVE SYSTEM DRIVEN BY INTERNAL COMBUSTION ENGINE MOUNTED ON AUTOMOTIVE VEHICLE

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 280 days.

This patent is subject to a terminal disclaimer.

(21) Appl. No.: 10/654,975

(22) Filed: Sep. 5, 2003

(65) Prior Publication Data

US 2004/0072641 A1   Apr. 15, 2004

(30) Foreign Application Priority Data

Oct. 10, 2002   (JP)   ............... 2002-297777

(51) Int. Cl.
*F16H 63/28*   (2006.01)
*H02K 7/18*   (2006.01)
*F02N 11/04*   (2006.01)

(52) U.S. Cl. ............... 474/70; 474/101; 290/4 C; 322/9

(58) Field of Classification Search ........ 474/133–135, 474/70; 290/4, 50, 406; 237/12.3; 126/247; 123/3, 179.25, 185.5, 90.23; 192/42–45; 310/78, 113
See application file for complete search history.

(56) References Cited

U.S. PATENT DOCUMENTS

| 2,020,591 | A | * | 11/1935 | Temple ............... 307/26 |
| 4,725,259 | A | | 2/1988 | Miyata |
| 5,638,931 | A | | 6/1997 | Kerr |
| 5,780,731 | A | * | 7/1998 | Matsui et al. ............... 73/118.1 |
| 6,027,032 | A | * | 2/2000 | Aoki et al. ............ 237/12.3 R |
| 6,201,310 | B1 | * | 3/2001 | Adachi et al. ............. 290/4 C |
| 6,397,808 | B1 | * | 6/2002 | Tanaka et al. ......... 123/179.25 |
| 6,965,173 | B2 | * | 11/2005 | Fukasaku et al. ......... 290/40 C |
| 2001/0007839 | A1 | * | 7/2001 | Guhr ........................ 474/101 |
| 2004/0067803 | A1 | * | 4/2004 | Nakamura .................. 474/70 |

FOREIGN PATENT DOCUMENTS

DE   19604182 A1 *   9/1996
EP   0 781 906 B1   12/2001

(Continued)

OTHER PUBLICATIONS

U.S. Appl. No. 10/648,389, filed Aug. 27, 2003, Nakamura.

*Primary Examiner*—Marcus Charles
(74) *Attorney, Agent, or Firm*—Oliff & Berridge, PLC

(57) ABSTRACT

Plural auxiliary devices such as a water pump and a generator coupled to a serpentine belt-drive system are driven by an internal combustion engine mounted on an automobile vehicle. The generator is divided into a first generator having a pulley in which a one-way clutch is installed and a second generator having a usual solid pulley. Fluctuations in the belt tension caused by changes in instantaneous rotational speed of the internal combustion engine are suppressed or reduced by the one-way clutch installed in the pulley of the first generator. An inertia torque of a rotor of the first generator may be made higher than that of the second generator because effects of the inertia torque on the belt tension fluctuations are alleviated by the one-way clutch.

3 Claims, 2 Drawing Sheets

FOREIGN PATENT DOCUMENTS

| | | | |
|---|---|---|---|
| JP | 55-53152 A * | 4/1980 | ................. 310/113 |
| JP | 57-140525 * | 8/1982 | ................... 123/3 |
| JP | A-02-219425 | 9/1990 | |
| JP | 05-64394 A * | 3/1993 | ................. 310/78 |
| JP | A-5-095637 | 4/1993 | |
| JP | A-7-072585 | 3/1995 | |
| JP | 07-149167 A * | 6/1995 | |
| JP | 2001-107827 A * | 4/2001 | |
| JP | 2001-309574 | 11/2001 | |
| JP | A-2002-138849 | 5/2002 | |

* cited by examiner

US 7,182,707 B2

BELT-DRIVE SYSTEM DRIVEN BY INTERNAL COMBUSTION ENGINE MOUNTED ON AUTOMOTIVE VEHICLE

CROSS-REFERENCE TO RELATED APPLICATION

This application is based upon and claims benefit of priority of Japanese Patent Application No. 2002-297777 filed on Oct. 10, 2002, the content of which is incorporated herein by reference.

BACKGROUND OF THE INVENTION

1. Field of the Invention

The present invention relates to a belt-drive system for driving auxiliary devices mounted on an automotive vehicle.

2. Description of Related Art

In a recent automotive vehicle, a space available for an engine compartment is becoming smaller in order to secure a sufficient space for a passenger compartment. To minimize a space occupied by a belt-drive system for driving various auxiliary devices including a generator, a so-called serpentine belt-drive system that drives all the auxiliary devices with a single belt is becoming popular. An example of such a serpentine belt-drive system is shown in FIG. 4. A single driving belt 31 is wound around a crankshaft pulley 40 connected to an internal combustion engine and all other pulleys to be driven by the engine. A pulley 100a is for driving a generator 100, a pulley 50 for a water pump, a pulley 60 for a compressor of an air-conditioner, and a pulley 70 for a power-steering pump. A pulley 30 of an automatic belt-tensioner 3 controls a tension of the driving belt 31. All the pulleys connected to respective auxiliary devices are driven by the engine through a single driving belt 31.

A generator is required to output a higher power to cover increasing electric loads for comfort and safety of passengers. Accordingly, it is unavoidable to increase a size of the generator and its rotor. As the rotor size increases, an inertia moment of the rotor also increases. On the other hand, there is a tendency to set an idling speed of an engine to a lower level to cope with exhaust gas problems. Further, in case of a diesel engine, a common rail system, in which a pressure in a combustion chamber is considerably increased for decreasing pollutants in exhaust gas, is getting popular in the market.

A driving torque of the crankshaft pulley fluctuates in a pulsating manner according to strokes of the engine, i.e., in synchronism with an explosion frequency of the engine. Therefore, an instantaneous rotational speed of the crankshaft fluctuates. Especially, during an engine-idling period in which the driving torque of the engine is small and unstable, the engine speed fluctuation is larger than that of other situations. When the idling speed is further lowered to cope with the exhaust gas problems, the rotational speed of the engine becomes further unstable, and the fluctuations in the rotational speed of the crankshaft pulley increase.

The auxiliary devices driven by the crankshaft pulley have respective inertia moments. Therefore, the rotational speed of each auxiliary device cannot instantaneously follow the fluctuations in the rotational speed of the crankshaft pulley. The tension of the driving belt becomes high when the driving belt is pulled by the crankshaft pulley according to its instantaneously increasing rotational speed. On the other hand, the tension of the driving belt becomes low when the rotational speed of the crankshaft pulley instantaneously decreases. The phenomenon mentioned above occurs at an upstream side of the driving belt with respect to the crankshaft pulley. An opposite phenomenon occurs at an downstream side of the driving belt. In short, the driving belt becomes repeatedly loose and tight according to the fluctuations in the rotational speed of the crankshaft pulley. The larger the rotational speed fluctuation becomes, the larger the belt tension fluctuation becomes.

The belt tension fluctuation is highly affected by the generator than by other auxiliary devices, because the rotor of the generator has a large inertia moment and a high pulley ratio. Therefore, a large fluctuation in the inertia toque (the inertia torque is a product of the inertia moment and acceleration or deceleration in the rotational speed) is involved in the generator. As the belt tension fluctuation becomes large, the belt is repeatedly loosened and tightened in a higher amount. This causes slippage between the belt and the pulleys, and a durability life of the belt is shortened.

In addition, when the fluctuation in the belt tension becomes large, the automatic belt-tensioner used in a serpentine belt-drive system widely swings to maintain the belt tension constant. The belt-tensioner may interfere with other devices, thereby generating noises and causing damages in the belt-tensioner and/or other devices. Especially, in the case where the belt-drive system is driven by a diesel engine, the fluctuations in its rotational speed tend to become larger because the pressure in the combustion chamber becomes higher as mentioned above. Therefore, the above problems are further serious for the diesel engine.

To cope with these problems, JP-B2-7-72585 proposes to use a one-way clutch in a pulley of a generator. Driving torque transmission between the crankshaft pulley and the generator is interrupted by the one-way clutch when the rotational speed of the crankshaft pulley is decreasing. When the rotational speed of the crankshaft pulley is increasing, the generator pulley is not coupled to the rotor of the generator until the generator pulley speed becomes equal to that of the rotor. Thus, the inertia torque of the rotor is prevented from being transmitted to the generator pulley by the one-way clutch, and the fluctuations in the belt tension are alleviated.

In the one-way clutch shown in JP-B2-7-72585, the torque transmission or interruption between the rotor and the pulley is carried out by rollers or sprags disposed in the one-way clutch. A considerable amount of mechanical stress is imposed on the rollers or the sprags in operation of the one-way clutch. On the other hand, it is required for the generator to generate a higher power at an idling speed which is lowered to improve exhaust gas. For this purpose, it is necessary to reduce the diameter of the generator pulley and to increase the pulley ratio. It is contradictory to a down-sizing requirement to make the axial length of the generator pulley longer. Therefore, the one-way clutch has to be made small in size. To make the one-way clutch small in size, it is necessary to make its components small and to reduce an amount of lubricant contained in the one-way clutch. This results in sacrificing the durability of the one-way clutch.

JP-A-2001-309574 proposes to provide an additional generator for supplying power to high voltage loads in addition to a generator for supplying power to conventional voltage loads. It also proposes to provide a circuit for exchanging power between two systems operating under different voltages. Though JP-A-2001-309574 shows an idea to use two generators, nothing about using those generators for reducing the fluctuations in the belt-tension is mentioned or shown.

SUMMARY OF THE INVENTION

The present invention has been made in view of the above-mentioned problems, and an object of the present invention is to provide an improved belt-drive system, in which the fluctuations in the belt tension are reduced. Another object of the present invention is to provide a power-generating system which can be easily mounted on an automobile. Yet another object of the present invention is to provide the belt-drive system in which a generator is able to generate power at a lower engine-idling speed.

Plural on-board devices, such as a generator, a water pump, a compressor for an air-conditioner, and a power-steering pump, are driven by an internal combustion engine mounted on a vehicle. A single belt is wound around a driving pulley connected to a crankshaft of the engine and pulleys connected to respective on-board devices. A pulley for an automatic belt-tensioner for maintaining the belt tension constant is also included in this belt-drive system that is often referred to as a serpentine belt-drive system.

Instantaneous rotational speed of an internal combustion engine fluctuates according to respective strokes of the engine. Fluctuations in the belt tension occur in accordance with the fluctuations in the rotational speed of the engine. The fluctuations are especially large when the engine operation is unstable at a low speed. If the fluctuations in the belt tension are large, the belt would be damaged and undesirable noise would be generated. In order to suppress the fluctuations in the belt tension, a conventional generator in the belt-drive system is divided into two generators, a first generator having a pulley including a one-way clutch and a second generator having a usual solid pulley.

The one-way clutch transmits rotational torque in one direction from the crankshaft pulley to the first generator pulley and interrupts torque transmission from the first generator pulley to the crankshaft pulley. The fluctuations in the belt tension are suppressed by the one-way clutch installed in the first generator pulley. Preferably, the first generator is positioned in the belt-drive system at a position closer to the belt-tensioner pulley than the second generator is positioned. In this is manner, the fluctuations in the belt tension are more effectively reduced.

An inertia moment of a rotor of the first generator may be made larger than that of the second generator. A diameter of the first generator pulley may be made smaller than that of the second generator pulley, so that the first generator rotates at a higher speed than the second generator. The number of armature conductors disposed in each slot of a stator of the first generator may be made larger than that of the second generator, so that the first generator generates a higher power than the second generator. The rotor of the first generator becomes to have a higher inertia torque than the rotor of the second generator by designing the first generator as above. However, the effects of the higher inertia torque on the belt tension fluctuations are suppressed or reduced by the one-way clutch.

According to the present invention, the belt tension fluctuations in the belt-drive system are surely suppressed. The life of the belt is prolonged, and noise or squeal in the belt-drive system is suppressed. The first generator is able to generate power at a lower engine-idling speed. Further, the generators are easily mounted on the engine block because they are small in size, compared with a conventional generator. Other objects and features of the present invention will become more readily apparent from a better understanding of the preferred embodiment described below with reference to the following drawings.

DETAILED DESCRIPTION OF THE PREFERRED EMBODIMENT

Figure 1:
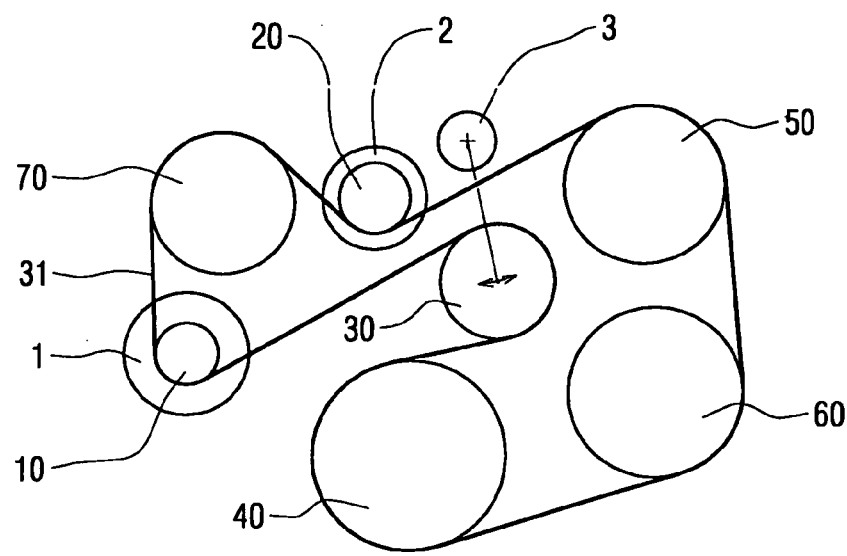
FIG. 1 is a schematic view showing a belt-drive system as an embodiment of the present invention.

A preferred embodiment of the present invention will be described with reference to FIGS. 1–3. FIG. 1 shows a belt-drive system according to the present invention. In a conventional belt-drive system shown in FIG. 4, only one generator 100 is included in the system. In the belt-drive system shown in FIG. 1, two generators, i.e., a first generator 1 and a second generator 2 are included in the system.

A pulley 10 connected to a first generator 1, a pulley 20 connected to a second generator 2, a pulley 50 of a water pump, a pulley 60 of a compressor of an air-conditioner, and a pulley 70 of a power-steering pump are all driven by a crankshaft pulley 40 connected to an internal combustion engine through a single belt 31 wound around all the pulleys. A pulley 30 of an automatic belt tensioner 3 is also disposed in the belt-drive system for maintaining the belt tension constant.

Figure 4:
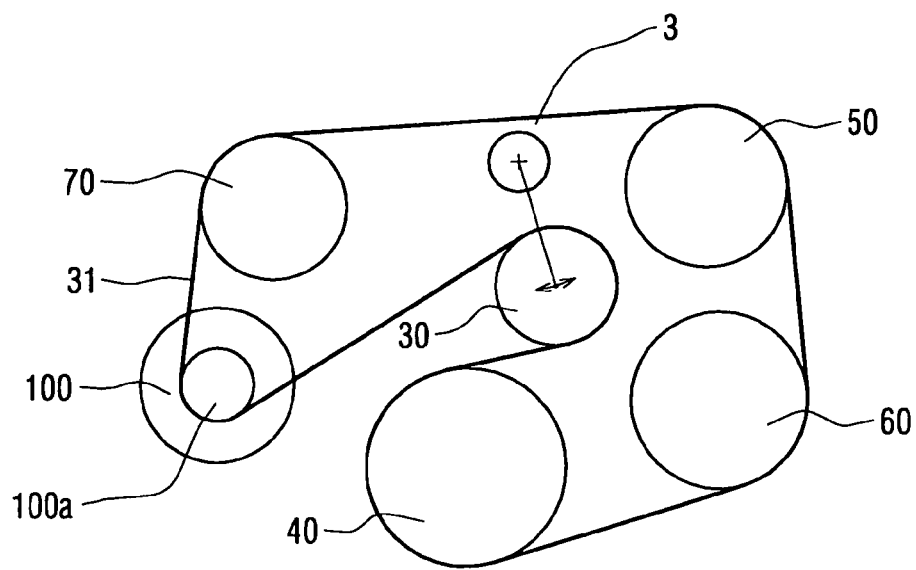
FIG. 4 is a schematic view showing a conventional belt-drive system.

Since a required amount of power is generated by two generators, a size of each generator is small compared with a conventional generator 100 shown in FIG. 4. Therefore, an inertia moment of a rotor of each generator is also small compared with that of the conventional generator. Since the first and the second generators are small in size and light in weight, they are easily mounted on an engine block.

Figure 2:
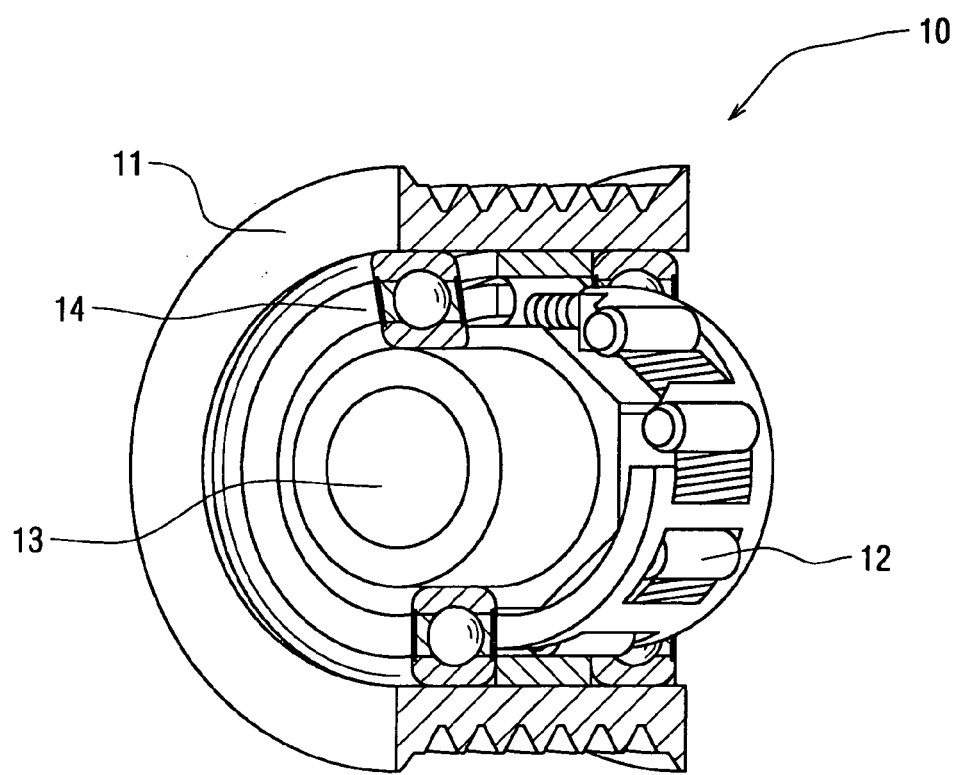
FIG. 2 is a cross-sectional perspective view showing a pulley including a one-way clutch.
Figure 3:
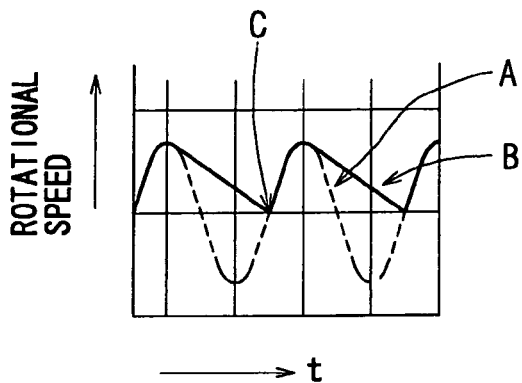
FIG. 3 is a graph showing rotational speeds of a crankshaft pulley and a rotor of a generator.

As shown in FIG. 2, the pulley 10 connected to the first generator 1 includes a one-way clutch that transmits rotational torque in one direction. That is, the rotational torque of the crankshaft pulley 40 is transmitted to the pulley 10, while transmission of the rotational torque from the pulley 10 to the crankshaft pulley 40 is interrupted. The pulley 10 that includes the one-way clutch is composed of: an outer ring 11 driven by the crankshaft pulley 40 through the belt 31; an inner ring 13 fixed to a rotor shaft of the first generator 1; clutch rollers 12 interposed between the outer ring 11 and the inner ring 13; and an auxiliary bearing 14 that permits relative rotation between both rings 11, 13 when the one-way clutch is interrupted.

Now referring to FIG. 3, operation of the one-way clutch will be described. Instantaneous rotational speed of the crankshaft pulley 40 periodically changes in response to an explosion frequency of the internal combustion engine, as shown by a curve "A". The periodically changing rotational speed of the crankshaft pulley 40 is transmitted to all the pulleys including the pulley 10 connected to the first generator 1. The torque transmission from the crankshaft pulley 40 to the rotor of the first generator 1 is interrupted when the rotational speed of the crankshaft pulley 40 becomes lower than that of the rotor by the one-way clutch. When the rotational speed of the crankshaft pulley 40 becomes equal to that of the rotor (at a point "C"), the rotor is driven again by the crankshaft pulley 40. Therefore, the rotational speed of the rotor of the first generator 1 varies as shown by a curve "B".

The size of the first generator 1 is much smaller than that of a conventional generator since two generators 1 and 2 are used in this embodiment in place of the single generator in the conventional system. The inertia moment of the rotor of the first generator 1 is also small compared with that of the conventional generator, and accordingly, a mechanical stress imposed on the clutch at a clutch engagement is also small. Therefore, the pulley 10 including the one-way clutch (referred to as a clutch-pulley) can be made smaller than the clutch-pulley of the conventional generator without sacrificing its durability life.

Since the diameter of the pulley 10 can be made small, a pulley ratio (a ratio obtained by dividing a diameter of the crankshaft pulley 40 by a diameter of the clutch-pulley 10) can be made large. Accordingly, the rotor of the first generator 1 is rotated at a relatively high speed even when the engine-idling speed is set to a low level for improving fuel economy and for reducing pollutants in exhaust gas.

The first generator 1 is designed to generate a higher power than the second generator 2. Accordingly, the inertia moment of the rotor of the first generator 1 is higher than that of the second generator 2. The clutch-pulley 10 is connected to the first generator 1, while a solid pulley 20 having no clutch function is connected to the second generator 2. This means that fluctuations in the belt-tension caused by the higher inertia moment of the first generator 1 is reduced by the clutch-pulley 10 connected to the first generator 1. Thus, the belt-tension fluctuations are effectively reduced. The squeal or noise and slippage in the belt-drive system are also reduced, and the durability of the driving belt 31 is improved.

Since the two generators 1, 2 are used in the system in place of the conventional single generator 100, each generator is small in size and the inertia moment of each rotor is also small. Therefore, the generators can be easily mounted on an engine block with short mounting stays formed together with housings of the generators. The generators can be firmly mounted with high stability against vibrations of the engine and the vehicle.

As shown in FIG. 1, the first generator 1 is positioned next to the pulley 30 of the automatic belt-tensioner 3 in the belt-drive system. Therefore, an amount of swing of the belt-tensioner pulley 30 can be effectively reduced by reducing the fluctuations in the belt tension. Further, damages and/or noises in the automatic belt-tensioner 3 can be effectively avoided.

The present invention is not limited to the embodiment described above, but it may be variously modified. For example, the diameter of the pulley 10 may be made smaller than that of the pulley 20, so that the first generator 1 rotates at a higher speed than the second generator 2. The larger fluctuations in the belt tension are caused by the first generator 1 that rotates at a higher speed. However, such fluctuations are effectively canceled or reduced by connecting the clutch-pulley 10 to the first generator 1. Since the rotor of the first generator 1 rotates at a relatively high speed even if the engine-idling speed is set to a low level, an amount of power generated at the idling speed can be increased. Further, since the rotor of the first generator 1 is disconnected from the crankshaft pulley 40 by the clutch-pulley 10 when the instantaneous rotational speed of the crankshaft pulley 40 is decreasing, an average rotational speed of the rotor can be increased. Accordingly, the amount of power generated at the idling speed is increased.

The number of the armature conductors in each slot in a stator of the first generator 1 may be made larger than that of the second generator 2. In this manner, the amount of power generated in the first generator 1 at a low speed can be further increased while suppressing the fluctuations in the belt tension. The idling speed, therefore, may be set to a further low level to thereby improve the exhaust pollutants and fuel economy. Further, the number of poles of the first generator 1 may be made larger than that of the second generator 2. In this manner, the output of the first generator 1 at a low speed can be improved, and the idling speed can be set at a lower level.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A belt-drive system driven by an internal combustion engine mounted on an automotive vehicle, the belt-drive system comprising:

a driving pulley connected to a crankshaft of the internal combustion engine;

a plurality of driven pulleys connected to respective on-board devices;

a belt wound around the driving pulley and the plurality of the driven pulleys so that all the driven pulleys are driven by the driving pulley, wherein:

the plurality of the driven pulleys include a pulley of an automatic belt-tensioner that controls a belt tension and pulleys of a first generator and a second generator, an inertia moment of the first generator being larger than an inertia moment of the second generator;

the pulley of the first generator includes a one-way clutch that transmits rotational torque in one direction from the crankshaft pulley to a rotor of the first generator;

the pulley of the second generator is a solid pulley that transmits rotational torque in both directions between the crankshaft pulley and a rotor of the second generator; and the pulley of the first generator is coupled to the belt at a position closer to the pulley of the belt-tensioner than the pulley of the second generator.

2. A belt-drive system driven by an internal combustion engine mounted on an automotive vehicle, the belt-drive system comprising:

a driving pulley connected to a crankshaft of the internal combustion engine;

a plurality of driven pulleys connected to respective on-board devices;

a belt wound around the driving pulley and the plurality of the driven pulleys so that all the driven pulleys are driven by the driving pulley, wherein:

the plurality of the driven pulleys include a pulley of an automatic belt-tensioner that controls a belt tension and pulleys of a first generator and a second generator, a diameter of the first generator pulley being smaller than a diameter of the second generator pulley;

the pulley of the first generator includes a one-way clutch that transmits rotational torque in one direction from the crankshaft pulley to a rotor of the first generator;

the pulley of the second generator is a solid pulley that transmits rotational torque in both directions between the crankshaft pulley and a rotor of the second generator; and the pulley of the first generator is coupled to the belt at a position closer to the pulley of the belt-tensioner than the pulley of the second generator.

3. The belt-drive system as in claim 2, wherein:

the number of conductors disposed in each slot of a stator of the first generator is larger than the number of conductors disposed in each slot of a stator of the second generator.

* * * * *